(12) United States Patent
Yang et al.

(10) Patent No.: US 11,150,755 B2
(45) Date of Patent: *Oct. 19, 2021

(54) TOUCH DISPLAY INTEGRATED CIRCUIT

(71) Applicant: FocalTech Electronics, Ltd., Grand Cayman (KY)

(72) Inventors: Ho-Nien Yang, Grand Cayman (KY); Pi-Chun Yeh, Grand Cayman (KY); Pei-Hung Hsiao, Grand Cayman (KY)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/717,585

(22) Filed: Dec. 17, 2019

(65) Prior Publication Data

US 2020/0125204 A1  Apr. 23, 2020

Related U.S. Application Data

(63) Continuation of application No. 15/891,713, filed on Feb. 8, 2018, now Pat. No. 10,551,954.

(30) Foreign Application Priority Data

Feb. 22, 2017  (TW) .................................. 106105838

(51) Int. Cl.
*G06F 3/041* (2006.01)
*G06F 3/047* (2006.01)
*G09G 3/20* (2006.01)

(52) U.S. Cl.
CPC ............ *G06F 3/0412* (2013.01); *G06F 3/047* (2013.01); *G06F 3/04164* (2019.05);
(Continued)

(58) Field of Classification Search
CPC ............ G09G 3/0412; G09G 3/04164; G09G 3/2074; G09G 3/047; G09G 3/20;
(Continued)

(56) References Cited

U.S. PATENT DOCUMENTS 4,550,039 A * 10/1985 Glaser .................... H01J 9/261
156/286
7,414,692 B2 * 8/2008 Kim ...................... G02F 1/13458
349/149
(Continued)

FOREIGN PATENT DOCUMENTS

CN  102214030 A  10/2011
CN  203117617 U  8/2013
(Continued)

*Primary Examiner* — Mihir K Rayan
(74) *Attorney, Agent, or Firm* — Muncy, Geissler, Olds & Lowe, P.C.

(57) ABSTRACT

A touch and display sensing integrated circuit and a touch display device using the same are provided. The touch display device includes a display and touch sensing integrated circuit and a glass substrate. The glass substrate includes touch/display common voltage electrodes, pixels, pads and conductive lines. Each pixel includes Q sub-pixels. The pads are electrically connected to the touch and display sensing integrated circuit. The $P^{th}$ and $(P+Q+1)^{th}$ pads are electrically connected to the touch/display common voltage electrode through the corresponding conductive lines, respectively. The $(P+1)^{th}$ to $(P+Q)^{th}$ pads are electrically connected to 1st to $Q^{th}$ sub-pixels of a pixel through the corresponding conductive lines, respectively. The pads are arranged in a first direction, and the conductive lines, which are electrically connected to the pads in a second direction, are non-interlaced.

18 Claims, 8 Drawing Sheets

(52) U.S. Cl.
CPC ............ *G09G 3/2074* (2013.01); *G09G 3/20* (2013.01); *G09G 2300/0426* (2013.01); *G09G 2310/0262* (2013.01); *G09G 2310/0272* (2013.01); *G09G 2310/0297* (2013.01)

(58) Field of Classification Search
CPC ... G09G 2300/0426; G09G 2310/0297; G09G 2310/0272; G09G 2310/0262
See application file for complete search history.

(56) References Cited

U.S. PATENT DOCUMENTS

| | | |
|---|---|---|
| 8,149,207 B2 | 4/2012 | Lai |
| 8,305,322 B2* | 11/2012 | Chung ................. G09G 3/3685 345/98 |
| 8,576,197 B2 | 11/2013 | Crandall |
| 8,836,650 B2* | 9/2014 | Wang ................. G06F 3/04164 345/173 |
| 9,052,774 B2* | 6/2015 | Matsumoto ......... G02F 1/13439 |
| 9,298,299 B2* | 3/2016 | Ludden ................. G06F 3/0412 |
| 9,459,482 B2 | 10/2016 | Abe et al. |
| 10,054,811 B2* | 8/2018 | Park ................... G02F 1/13338 |
| 10,325,534 B2* | 6/2019 | Kim ........................ G09G 3/20 |
| 10,459,562 B2* | 10/2019 | Wang .................... G06F 3/0412 |
| 10,551,954 B2* | 2/2020 | Yang .................... G06F 3/04164 |
| 2010/0053057 A1 | 3/2010 | Chung et al. |
| 2011/0169759 A1 | 7/2011 | Wang et al. |
| 2012/0229421 A1* | 9/2012 | Kim ...................... G06F 3/0412 345/174 |
| 2013/0106747 A1 | 5/2013 | Choi et al. |
| 2013/0328807 A1 | 12/2013 | Matsumoto |
| 2015/0091849 A1* | 4/2015 | Ludden ................. G06F 3/0443 345/174 |
| 2015/0338963 A1 | 11/2015 | Lee |
| 2016/0188059 A1 | 6/2016 | Lee et al. |
| 2016/0188115 A1 | 6/2016 | Seo |
| 2018/0181277 A1 | 6/2018 | Ahn |

FOREIGN PATENT DOCUMENTS

| | | |
|---|---|---|
| CN | 103941926 A | 7/2014 |
| CN | 104317462 A | 1/2015 |
| CN | 105489162 A | 4/2016 |
| CN | 105824143 A | 8/2016 |
| TW | 201032304 A | 9/2010 |
| TW | 201337611 A | 9/2013 |
| TW | I456471 B | 10/2014 |
| TW | 201441885 A | 11/2014 |

\* cited by examiner

TOUCH DISPLAY INTEGRATED CIRCUIT

This application is a continuation of co-pending application Ser. No. 15/891,713 filed on Feb. 8, 2018, for which priority is claimed under 35 U.S.C. § 120; and this application claims priority of Application No. 106105838 filed in Taiwan R.O.C. on Feb. 22, 2017 under 35 USC 119; the entire content of all of which are hereby incorporated by reference.

BACKGROUND OF THE INVENTION

Field of the Invention

The present invention relates to the touch and display technology, and more particularly to a display and touch sensing integrated circuit capable of decreasing the number of layout layers of a touch display panel, and a touch display device using the same.

Description of the Related Art

FIG. 1 is a configuration diagram showing the conventional integrated circuit outer lead bonding (OLB) of a single chip controller for driving an in-cell display panel. Referring to FIG. 1, symbol 101 represents outer lead bonding positions of the touch driver; and symbol 102 represents outer lead bonding positions of the display driver. Conventionally, outer lead bonding positions 101 of the touch driver are arranged on two sides of a single chip controller integrated circuit 100. In addition, outer lead bonding positions 102 of the display driver are arranged in the middle of the single chip controller integrated circuit 100.

However, this pin configuration of the integrated circuit of the single chip controller of the in-cell display panel causes that the wires of the display driver are connected to the middle of the single chip controller and the wires of the touch driver are connected to the edges on left and right sides of the single chip controller. Thus, the conductive lines or wires for touch driver and display driver are inevitably caused to interlace with each other. In order to satisfy the pins of the single chip controller, the wires of the display driver and the wires of the touch driver of the in-cell display panel must be made of different metal layers, so that the wire layout needs to use multiple metal layers. Thus, it is possible to increase the manufacturing cost of the display touch panel, and the risk of low throughput and yield rate.

SUMMARY OF THE INVENTION

An objective of the present invention is to provide a touch and display sensing integrated circuit and a touch display device using the same capable of decreasing the number of layout layers of a touch display panel and simplifying a circuit layout thereof.

An objective of the present invention is to provide a touch and display sensing integrated circuit and a touch display device using the same capable of decreasing manufacturing cost and increasing production yield.

In view of this, the present invention provides a touch and display sensing integrated circuit for controlling a touch display device. The touch and display sensing integrated circuit includes a touch input/output circuit, a source driving circuit, a common circuit, touch input/output pins and data output pins. The touch input/output circuit has input/output terminals arranged in a first direction. The source driving circuit has data output pins arranged in the first direction. The common circuit, which is coupled to the touch input/output circuit and a display output circuit, respectively controls the touch input/output circuit and the display output circuit. The common circuit is arranged between the touch input/output circuit and the display output circuit. The touch input/output pins are respectively coupled to the input/output terminals of the touch input/output circuit. The data output pins are respectively coupled to data output terminals of the source driving circuit.

In the touch and display sensing integrated circuit for controlling a touch display device according to a preferred embodiment of the present invention, one side of a substrate of the touch display device has a longitudinal arrangement area in a first direction, and the touch and display sensing integrated circuit is arranged at the longitudinal arrangement area. In a preferred embodiment, when the touch and display sensing integrated circuit is arranged on the substrate of the touch display device, the data output terminals of the source driving circuit and the data output pins are parallel to one side of the substrate, and also, the input/output terminals of the touch input/output circuit and the touch input/output pins are parallel to one side of the substrate. Moreover, the touch input/output pins and the data output pins are parallel to one side of the substrate.

In the touch and display sensing integrated circuit for controlling a touch display device according to a preferred embodiment of the present invention, the touch display device comprises a plurality of pixels, and each pixel comprising Q sub-pixels, wherein the touch input/output pins and the data output pins are arranged in the first direction according to an arrangement, wherein the arrangement comprises: Q data output pins between every two of the touch input/output pins, where Q is a natural number greater than 0. In a preferred embodiment of the present invention, the touch input/output pins are arranged in the first direction, the data output pins are arranged in the first direction and in correspondence with the touch input/output pins, the touch input/output pins and the data output pins are arranged in order and in parallel in a second direction, and the first direction is orthogonal to the second direction.

The present invention further provides a touch display device. The touch display device comprises a substrate, on which are disposed with a plurality of touch/display common voltage electrodes, a plurality of conductive lines, a plurality of pixels and a plurality of pads. Each pixel comprises Q sub-pixels. The pads are electrically connected to a touch and display sensing integrated circuit. The $P^{th}$ and $(P+Q+1)^{th}$ pads are respectively electrically connected to the touch/display common voltage electrode through the corresponding conductive lines, and the $(P+1)^{th}$ to $(P+Q)^{th}$ pads are respectively electrically connected to the 1st to Qth sub-pixels of one of the pixels through the corresponding conductive lines, wherein the pads are arranged in a first direction, and the conductive lines, which are electrically connected to the pads in a second direction, are non-interlaced, where P and Q are natural numbers, and Q>1.

In the touch display device according to a preferred embodiment of the present invention, the conductive lines comprise a plurality of first conductive lines and a plurality of second conductive lines. The first conductive lines are configured to serve as a first conductive layer on the substrate. The second conductive lines are configured to serve as a second conductive layer on the substrate, wherein the $K^{th}$ pad and the $(K+_2)^{th}$ pads are respectively coupled to the corresponding first conductive lines, and the $(K+1)^{th}$ pad is coupled to the corresponding second conductive line, wherein the $P^{th}$ and $(P+Q+1)^{th}$ pads are respectively electrically connected to the touch/display common voltage electrode, and the $(P+1)^{th}$ to $(P+Q)^{th}$ pads are respectively electrically connected to the 1st to $Q^{th}$ sub-pixels of one of the pixels, where K is a natural number.

In the touch display device according to a preferred embodiment of the present invention, the touch and display sensing integrated circuit comprises a touch input/output circuit, a source driving circuit, a common circuit, a plurality of touch input/output pins and a plurality of data output pins. The touch input/output circuit comprises a plurality of input/output terminals arranged in the first direction. The source driving circuit comprises a plurality of data output terminals arranged in the first direction. The common circuit is coupled to the touch input/output circuit and the source driving circuit and respectively controls the touch input/output circuit and the source driving circuit, wherein the common circuit is disposed between the touch input/output circuit and the source driving circuit. The touch input/output pins are configured to be connected to the pads of the touch/display common voltage electrodes, and coupled to the input/output terminals of the touch input/output circuit. The data output pins are configured to be connected to the pads of the sub-pixels of the pixels, and coupled to the data output terminals of the source driving circuit.

The essence of the present invention is to change the circuit layout of the touch and display sensing integrated circuit, as well as the pin layout of the touch and display sensing integrated circuit at the same time. Furthermore, the pads for touch sensing and the pads for displaying data are arranged alternately on the substrate of the in-cell touch display device without interlacing with the layout on the panel. Meanwhile, the use of the metal layer, which serves as fan-out wires from the touch and display integrated circuit to the in-cell touch display panel, can be reduced in practical. Thus, the manufacturing cost may be decreased as well as preventing from affecting the production yield and efficiency caused by the modified process of the touch display panel. Meanwhile, because no interlacing layout is needed on the panel, the interference problem caused by the interlacing layout in the practical operation may also be avoided.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
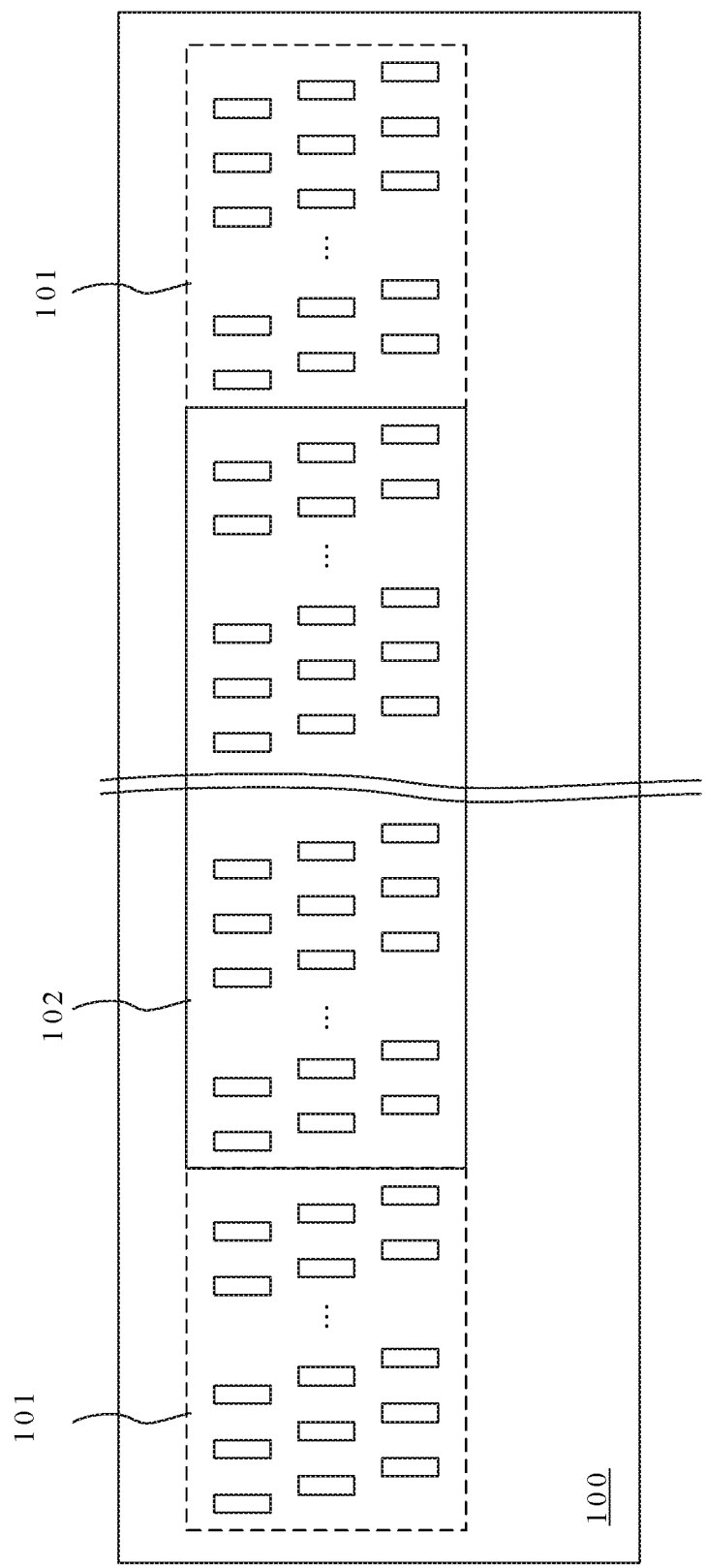
FIG. 1 is a configuration diagram showing the conventional integrated circuit outer lead bonding (OLB) of a single chip controller for driving an in-cell display panel.

In the embodiments and claims, spatially relative terms, such as "underlying," "below," "lower," "overlying," "upper" and the like, may be used herein for ease of description to describe one element or feature's relationship to another element(s) or feature(s) as illustrated in the figures. Those skilled in the art may understand that the spatially relative terms are intended to encompass different orientations of the apparatus in use or operation in addition to the orientation depicted in the figures. For example, if an apparatus in the drawing is turned over, elements or features described as "below" or "beneath" other elements or features would then be oriented "above" the other elements. The terms "below" or "beneath" can, therefore, encompass both an orientation of above and below. If the apparatus may be otherwise oriented (rotated 90 degrees or at other orientations), then the spatially relative descriptors used herein may likewise be interpreted accordingly.

Figure 2:
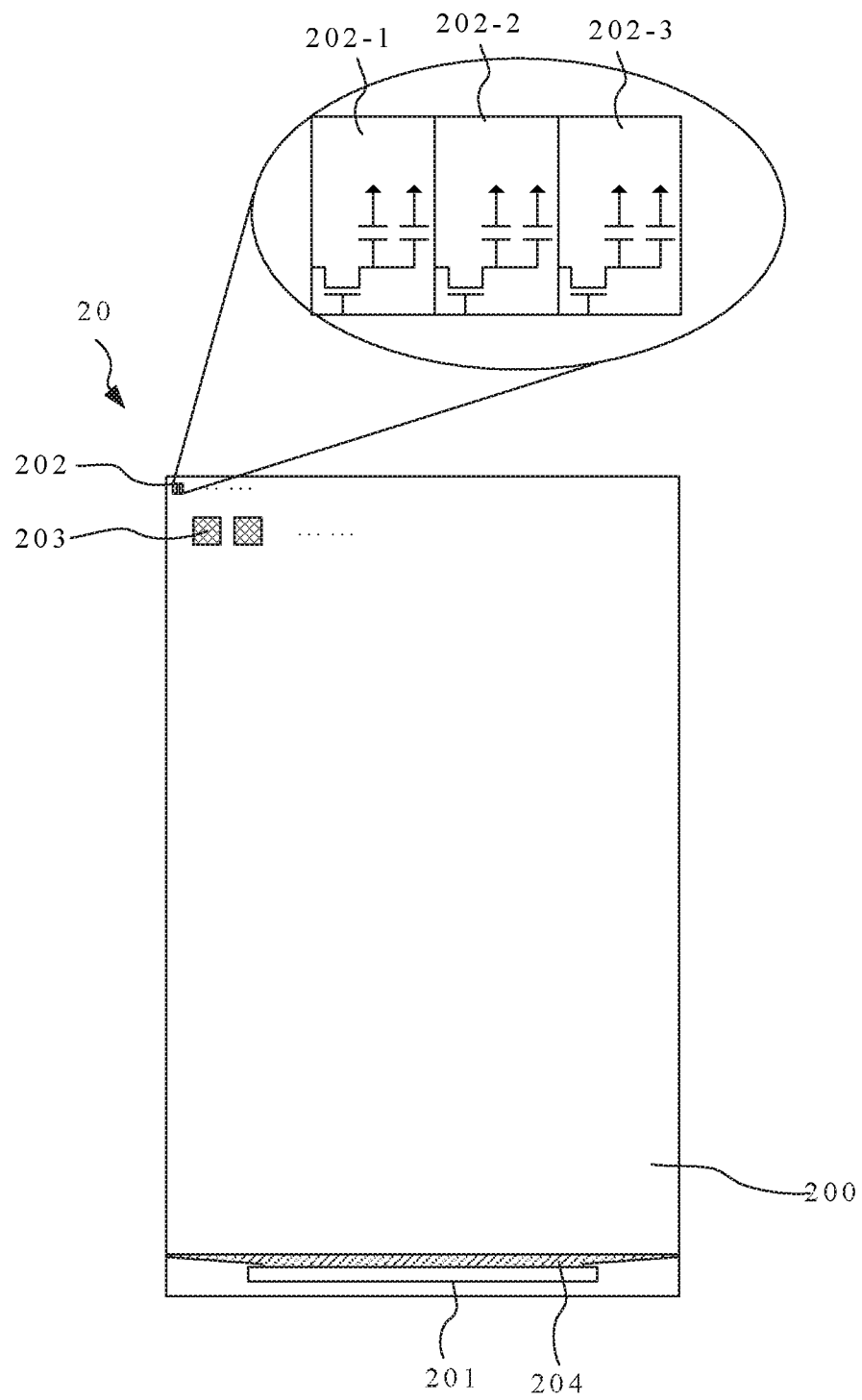
FIG. 2 is a schematic view showing a touch display device according to a preferred embodiment of the present invention.

FIG. 2 is a schematic view showing a touch display device 20 according to a preferred embodiment of the present invention. Referring to FIG. 2, the touch display device 20 includes a substrate 200 and a touch and display sensing integrated circuit 201. The substrate 200 includes pixels 202, touch/display common voltage electrodes 203, conductive lines 204 and pads (not shown in this figure) for configuring the touch and display sensing integrated circuit 201. The conductive lines 204 are electrically connected to the touch and display sensing integrated circuit 201, the pixels 202 and the touch/display common voltage electrodes 203. In this embodiment, each pixel 202 includes red, green and blue sub-pixels 202-1, 202-2 and 202-3, and the touch/display common voltage electrode 203 may cover multiple pixels 202.

Figure 3:
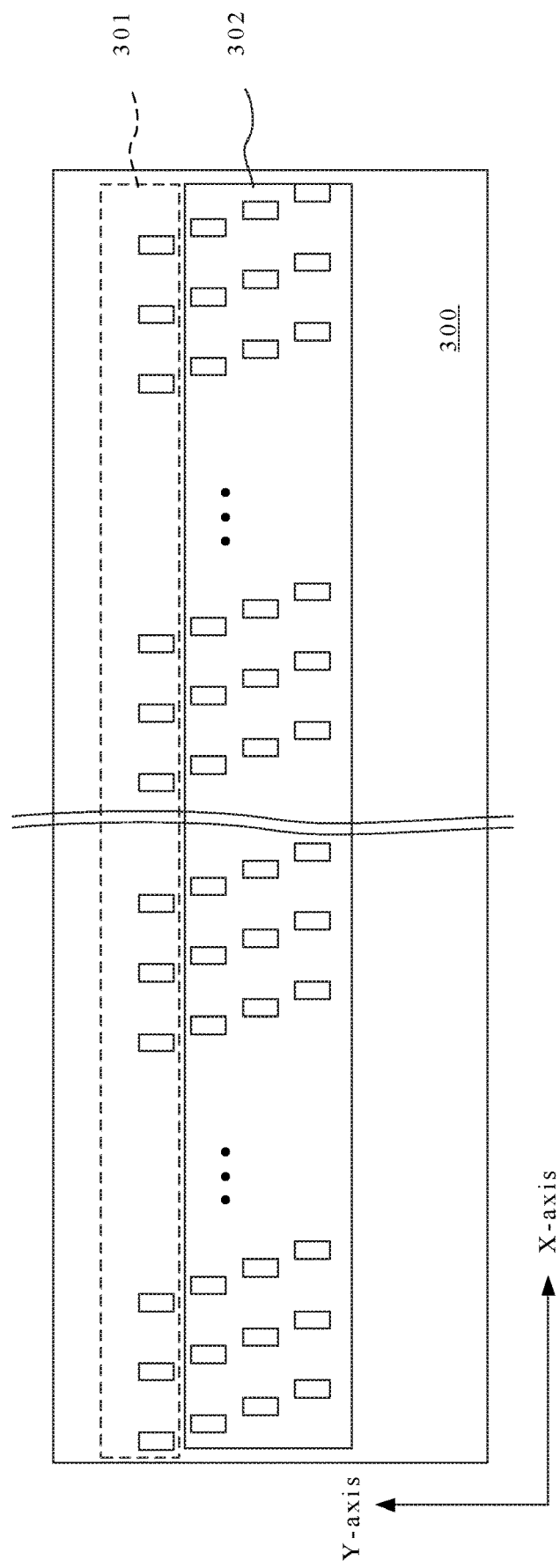
FIG. 3 is a configuration diagram showing the integrated circuit outer lead bonding (OLB) of a touch and display sensing integrated circuit according to a preferred embodiment of the present invention.

FIG. 3 is an configuration diagram showing the integrated circuit outer lead bonding (OLB) of a touch and display sensing integrated circuit (also referred to as an integrated driver controller (IDC)) 300 according to a preferred embodiment of the present invention. Referring to FIG. 3, symbol 301 represents the outer lead bonding positions of the touch/display common voltage; and symbol 302 represents the outer lead bonding positions of the source driver. To be clear, the X axis and Y axis are also marked on the figure. The outer lead bonding positions 301 of the touch/display common voltage of the touch and display sensing integrated circuit 300 are arranged in the first direction (X-axis direction). In addition, the outer lead bonding positions 302 of the source driver of the touch and display sensing integrated circuit 300 are arranged in the first direction in the same manner. In an embodiment, the outer lead bonding positions 302 of the source driver may be arranged in three rows in order in the second direction (Y-axis direction). In other words, the outer lead bonding positions 302 of the three source drivers are arranged as a group.

According to the configuration of the outer lead bonding of the touch and display sensing integrated circuit 300, the outer lead bonding positions 301 of each touch/display common voltage may be equidistantly arranged in the same direction. So, the wiring from the panel display area to the outer lead bonding positions 301 of the touch/display common voltage is prevented from interlacing with the layout between the panel display area and the outer lead bonding positions 302 of the source driver. Thus, the panel wires corresponding to the outer lead bonding positions 301 of the touch/display common voltage and the panel wires corresponding to the outer lead bonding positions 302 of the source driver may be adopted the same metal layer, and arranged on the same plane.

Figure 4:
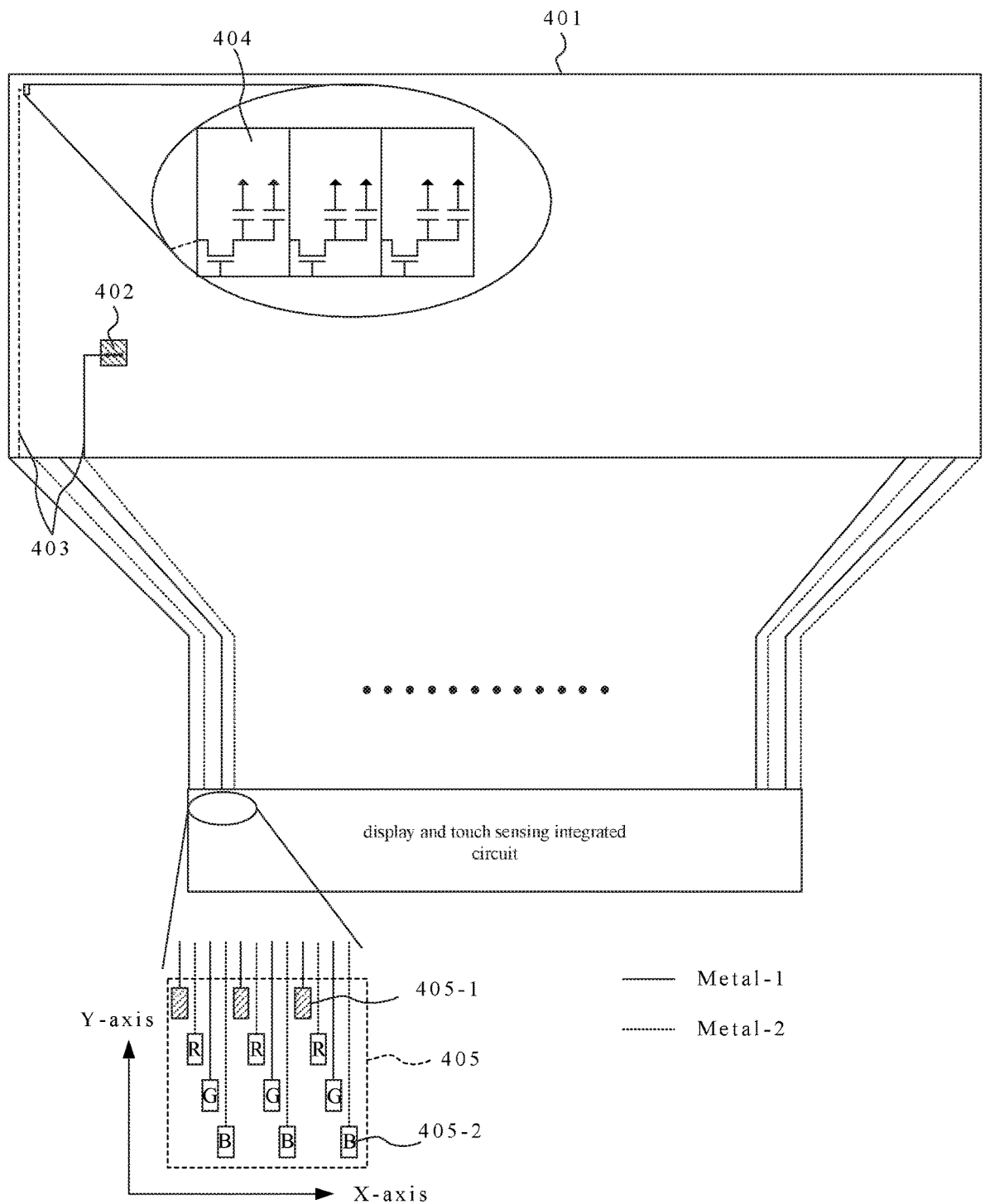
FIG. 4 is a configuration diagram showing a touch display device according to a preferred embodiment of the present invention.

FIG. 4 is a configuration diagram showing a touch display device according to a preferred embodiment of the present invention. In this embodiment, the touch display device may include a substrate 401, on which touch/display common voltage electrodes 402, conductive lines 403, pixels 404 and pads 405 are disposed. The substrate 401 may be made of glass or flexible material such as plastic or the like. In addition, FIG. 4 also shows the pad 405-1 electrically connected to the touch/display common voltage electrode 402 and the pad 405-2 electrically connected to the sub-pixel of the pixel 404. As shown in FIG. 4, each touch/display common voltage electrode 402 may cover multiple pixels 404.

In FIG. 4, the pad 405-1 electrically connected to the touch/display common voltage electrode 402 may be equidistantly arranged in the X-axis direction. In addition, a pad group composed of, for example, three pads 405-2, which are electrically connected to the sub-pixels of the pixel 404, may be arranged between every two pads 405-1. In an embodiment, the three pads 405-2 of the pad group may be respectively electrically connected to the sources of the thin film transistors of the red, green and blue sub-pixels of the pixel 404 to provide the display update data.

In this embodiment, the conductive lines 403 electrically connected to each pad 405 in the Y-axis direction may be not interlaced. In other words, each conductive line 403 may be electrically connected to the corresponding pad 405 without interlacing with other conductive lines 403, and each conductive line of the different layers may be electrically connected to the corresponding pad without interlacing or overlapping with each other as well. Thus, the conductive lines 403 may also be arranged on the same layer or different layers. However, a conventional display panel with higher resolution, such as 720×1280, includes 2160 lines in the layout of the source driver. When the touch wires or conductive lines are counted, the total lines and wires may reach 2880. In this case, the wire layout is made in accompanying with the metal-1 and metal-2 processes and metal layers (Metal-1 and Metal-2) are adopted to serve as the wire layout to decrease the manufacture complexity. Because the integrated circuit outer lead bonding in one embodiment of the present invention may be arranged as shown in FIG. 3, the wires or conductive lines from the touch and display sensing integrated circuit 300 to the touch/display common voltage electrodes 402 of the panel may be not interlaced with the wires of the sub-pixels. Thus, it is possible to use only two metal layers (Metal-1 and Metal-2) to complete the fan-out wires between the touch sensing circuit, the source driving circuit and the touch display panel, as shown in FIG. 4.

Figure 5:
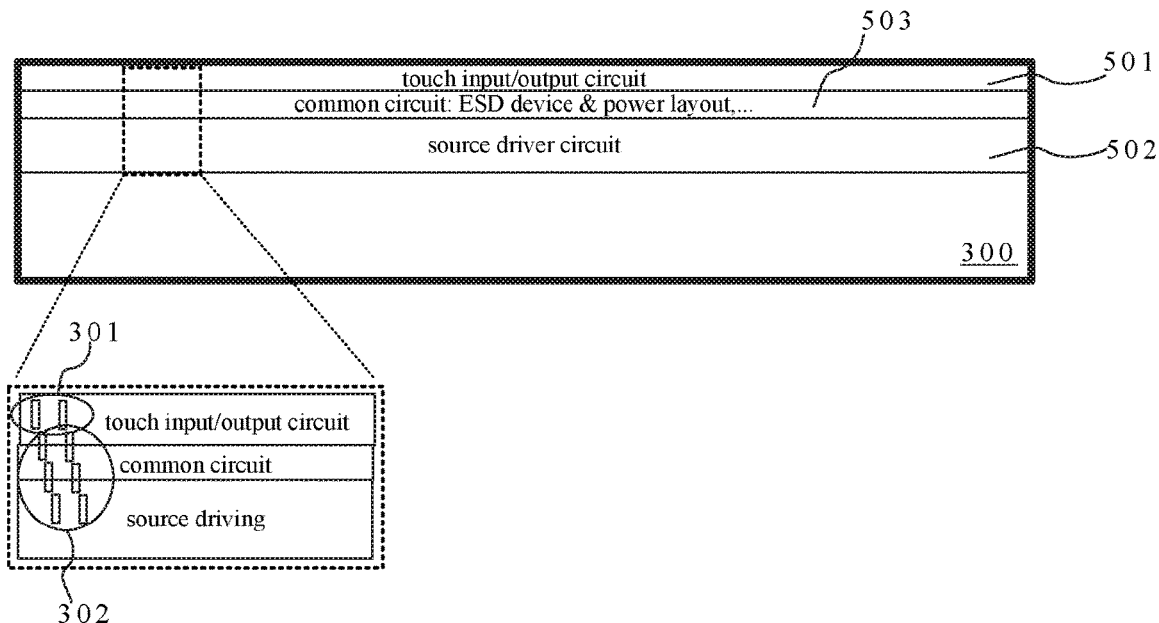
FIG. 5 is a configuration diagram showing an integrated circuit inside a display and touch sensing integrated circuit 300 according to a preferred embodiment of the present invention.

In order to achieve the arrangement of the outer lead bonding positions of FIGS. 4 and 3, the circuit configuration inside the touch and display sensing integrated circuit 300 may be designed as shown in FIG. 5. In the embodiment of FIG. 5, the pad 405-1 electrically connected to the touch/display common voltage electrode 402 is disposed above (outside) the touch and display sensing integrated circuit 300. Thus, the top of the touch and display sensing integrated circuit 300 is also used for the arrangement of a touch input/output circuit 501. In this embodiment, the touch input/output circuit 501 and a source driving circuit 502 (source driver IC) are arranged longitudinally. Similarly, corresponding to the position of the pad 405-2 which is electrically connected to the sub-pixel of the pixel 404, the portion of the source driving circuit 502 is placed under (inside) the touch and display sensing integrated circuit 300. Meanwhile, the layout of the integrated circuit is also longitudinal. In addition, some common circuits 503, such as electrostatic discharge (ESD), power line and the like, can be arranged between the touch input/output circuit 501 and the source driving circuit 502.

Figure 6:
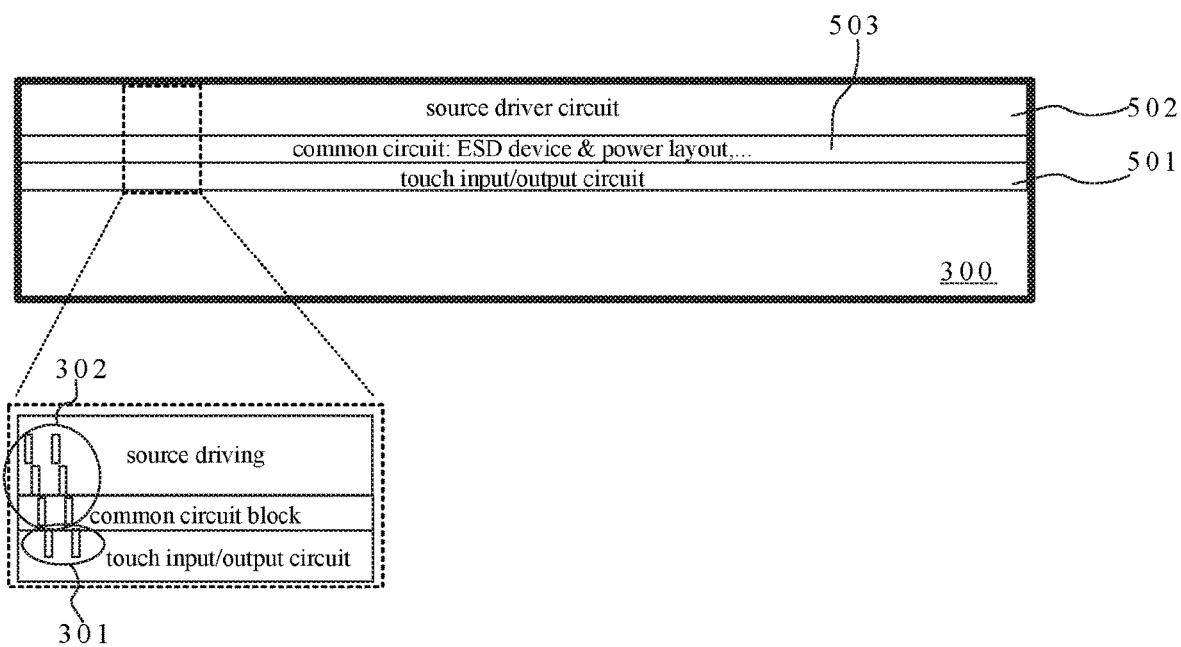
FIG. 6 is a configuration diagram showing an integrated circuit inside the display and touch sensing integrated circuit 300 according to a preferred embodiment of the present invention.

In the above-mentioned embodiment, the pad 405-1 electrically connected to the touch/display common voltage electrode 402 and arranged in the first row (on the outermost side) in the X-axis direction is served as an example. If the touch input/output circuit 501 is arranged under the touch and display sensing integrated circuit 300, the pad 405-1 electrically connected to the touch/display common voltage electrode 402 may be arranged in the last row (on the innermost side) in the X-axis direction, as shown in the embodiment of FIG. 6. In FIG. 6, the touch input/output circuit 501 is arranged under the display and touch sensing integrated circuit 300, and the source driving circuit 502 is arranged above the display and touch sensing integrated circuit 300. Similarly, the common circuit 503 is arranged between the touch input/output circuit 501 and the source driving circuit 502.

Figure 7:
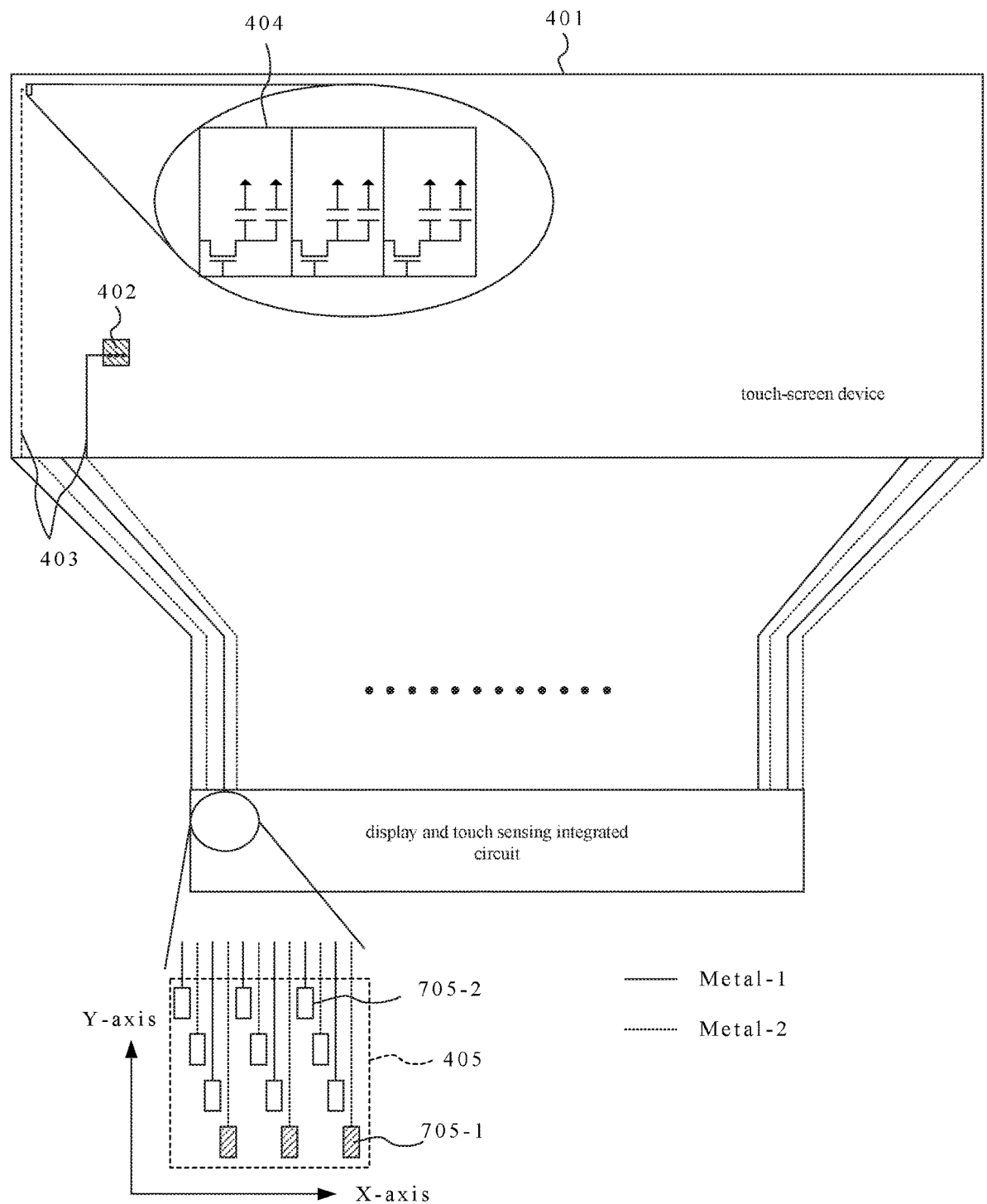
FIG. 7 shows a configuration diagram corresponding to the touch display device of the display and touch sensing integrated circuit 300 of FIG. 6 according to a preferred embodiment of the present invention.

FIG. 7 shows a configuration diagram corresponding to the touch display device of the display and touch sensing integrated circuit 300 of FIG. 6 according to a preferred embodiment of the present invention. Referring to FIGS. 7 and 4, the difference between this embodiment and the embodiment of FIG. 4 is that each of the pads 705-1 electrically connected to the touch/display common voltage electrode 402 is arranged in the last row, and the pads 705-2 electrically connected to the sub-pixels of the pixel 404 are arranged in the first to third rows. That is, the pads 705-1 electrically connected to the touch/display common voltage electrode 402 are arranged at the outermost side of the substrate 401, and in FIG. 4, the pads 405-2 electrically connected to the sub-pixels are arranged at the outermost side of the substrate 401.

In the above-mentioned embodiment, the pixel including three sub-pixels (red R, green G and blue B sub-pixels) is served as an example. However, those skilled in the art should know that a pixel may also include sub-pixels such as red R, green G blue B and white W and so on. So, in the Y-axis direction in the above-mentioned embodiment, four pads 405-2 electrically connected to the sub-pixels of the pixel 404 may also be arranged between any two pads 405-1 electrically connected to the touch/display common voltage electrode 402. Therefore, the present invention is not limited thereto. Specifically, the pads 405-2 electrically connected to the sub-pixels, such as three (RGB) sub-pixels or four (RGBW) sub-pixels, may also be arranged between any two pads 405-1 near or neighboring each other. The term "near or neighboring" may represent that the touch/display common voltage electrode electrically connected to the pads may be disposed near or adjacent to the touch/display common voltage electrode electrically connected to the near or adjacent pads. It is understood that the number of the pads 405-2 arranged between the pads 405-1 may be adjusted according to the number of the electrically connected sub-pixels, and that the invention is not limited thereto.

Furthermore, regarding to the configuration of the touch input/output pins and the outer lead bonding positions in the above-mentioned embodiment, the arrangement are arranged in four rows in the Y direction, and three sub-pixels are arranged between the pads of every two common voltage electrodes in the X direction. However, the configuration is not limited thereto. For example, FIGS. 8A to 8D are configuration diagrams showing touch input/output pins and outer lead bonding positions of the touch display device according to a preferred embodiment of the present invention, wherein symbol 801 represents the pad of the touch/display common voltage electrode, symbol 802 represents the pad of the sub-pixel, symbol R represents the red sub-pixel, symbol G represents the green sub-pixel, and symbol B represents the blue sub-pixel. However, the pads 802 labeled as R, G and B in the figure is not intended to limit the transmission of R, G and B signals only. For example, in the embodiment where a multiplexer is correspondingly used, the combinations for transmitting the BRG or GBR signal may also be used. It is understood that the pad 802 is used to transmit the sub-pixel signal, but is not limited to the transmission aspect disclosed in the figures.

Figure 8A:
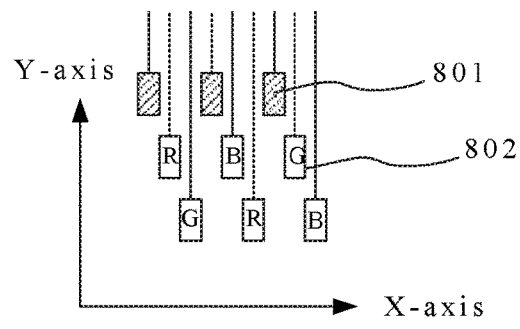
FIG. 8A is a configuration diagram showing touch input/output pins and outer lead bonding positions of the touch display device according to a preferred embodiment of the present invention.
Figure 8B:
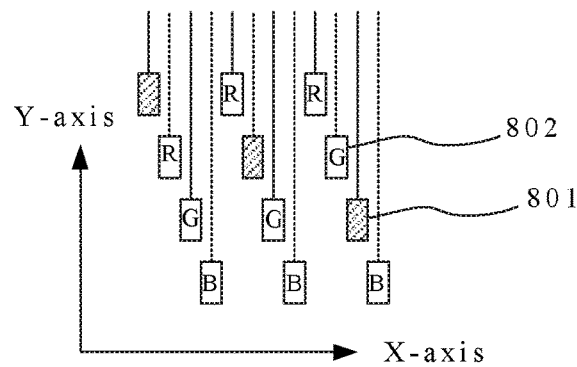
FIG. 8B is a configuration diagram showing touch input/output pins and outer lead bonding positions of the touch display device according to a preferred embodiment of the present invention.
Figure 8C:
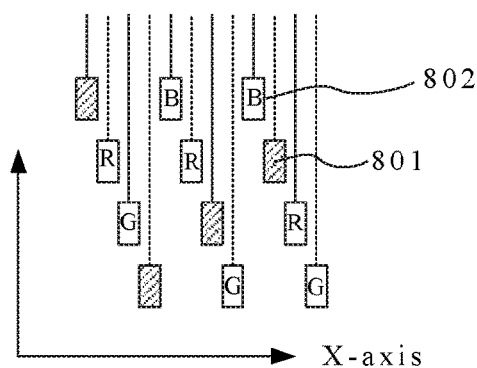
FIG. 8C is a configuration diagram showing touch input/output pins and outer lead bonding positions of the touch display device according to a preferred embodiment of the present invention.
Figure 8D:
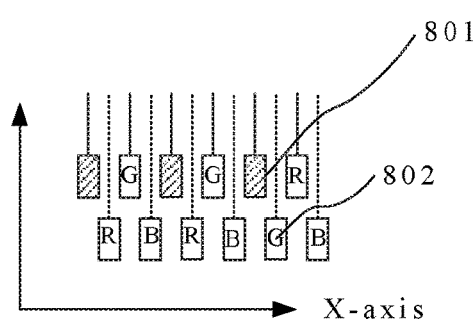
FIG. 8D is a configuration diagram showing touch input/output pins and outer lead bonding positions of the touch display device according to a preferred embodiment of the present invention.

In FIG. 8A, the pads are arranged in three rows in the Y direction and the pads 802 of two sub-pixels are arranged between the pads 801 of every two common voltage electrodes in the X direction. In FIG. 8B, the pads are arranged in four rows in the Y direction, but the pads 802 of four sub-pixels are arranged between the pads 801 of every two common voltage electrodes in the X direction, and the four sub-pixels do not belong to the same pixel. In FIG. 8C, although the pads are arranged in four rows in the Y direction, the pads 802 of two sub-pixels are arranged between the pads 801 of every two common voltage electrodes in the X direction. Similarly, in FIG. 8D, although the pads are arranged in two rows in the Y direction, the pads 802 of three sub-pixels are arranged between the pads 801 of every two common voltage electrodes in the X direction. The arrangement of the touch input/output pin and the arrangement of the outer lead bonding position belong to optional designs, so the present invention is not limited to the arrangement of the above-mentioned touch input/output pin.

Figure 9:
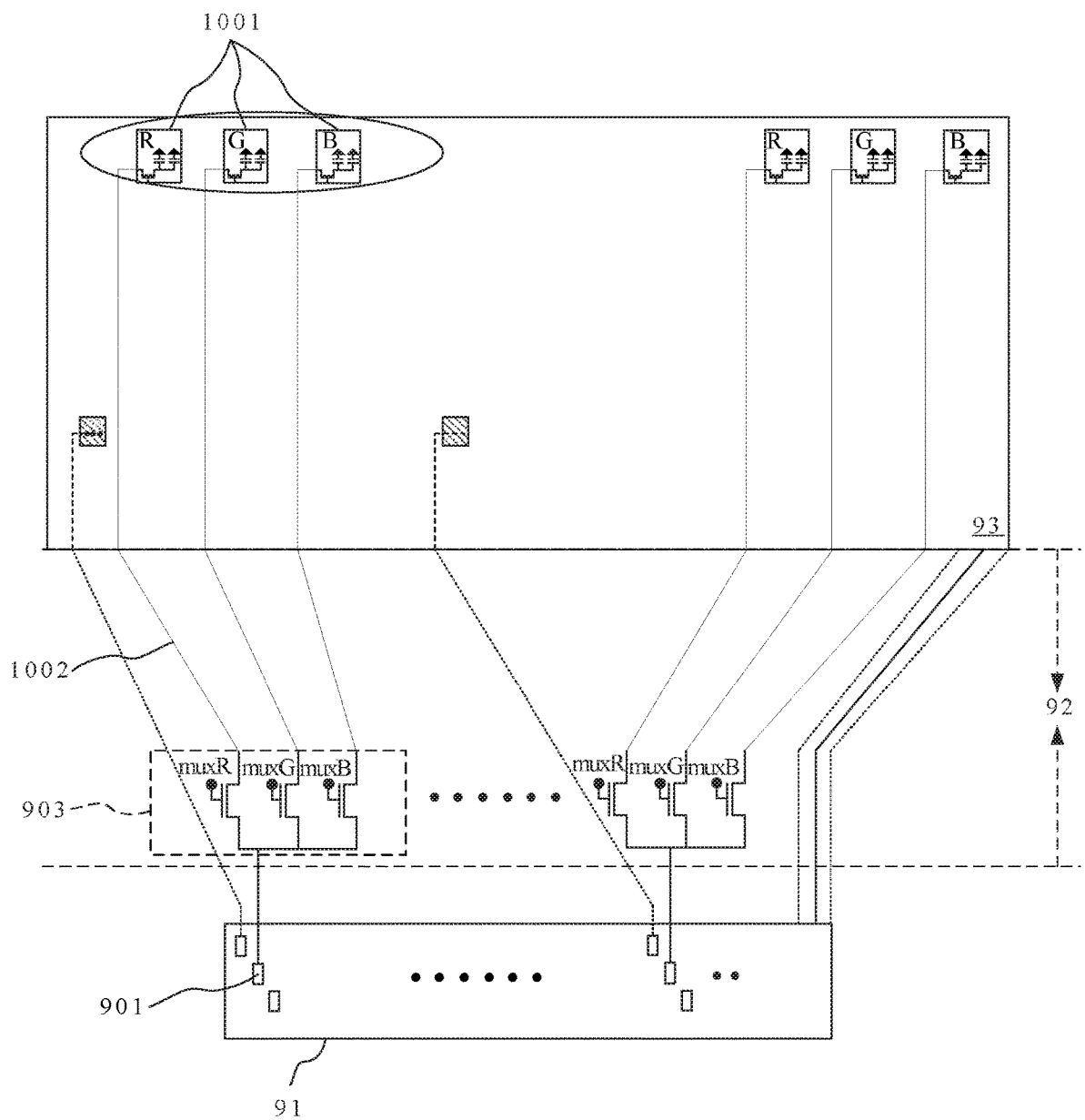
FIG. 9 is a schematic configuration view showing a touch display device according to a preferred embodiment of the present invention.

FIG. 9 is a schematic configuration view showing a touch display device according to a preferred embodiment of the present invention. Referring to FIG. 9, a substrate in the touch display device includes a bonding area 91, a fan-out area 92 and a display area (active area) 93. In this embodiment, each of the data output pins is electrically connected to three sub-pixels 1001 of the corresponding pixel through a multiplexer 903 and conductive lines 1002 configured in the fan-out area 92. So, the red, green and blue data may be outputted to the red, green and blue sub-pixels 1001 through only one data output pin pad 901 in this embodiment. The display and touch sensing integrated circuit 300 may divide the display data into red, green and blue data and transmits the red, green and blue data to the corresponding sub-pixels through the data output pin pad 901, the multiplexer 903 and the corresponding conductive lines 1002. Furthermore, the pin configuration of the pads 901 may be found in FIGS. 8A to 8D and the corresponding descriptions, and detailed descriptions thereof will be omitted.

In summary, the essence of the present invention is to change the circuit layout of the touch and display sensing integrated circuit as well as the pin layout of the touch and display sensing integrated circuit at the same time. Furthermore, the pads for touch sensing and the pads for displaying data are arranged alternately on the substrate of the in-cell touch display device without interlacing with the layout on the panel, so number of metal layers on the touch display panel, which serve as fan-out wires from the touch and display integrated circuit to the in-cell touch display panel, may be reduced, even no additional metal layer is needed in the case of using the metal-1 and metal-2 layers as fan-out wires. Thus, the manufacturing cost may be decreased as well as preventing from affecting the production yield and efficiency caused by the modified process of the touch display panel. Meanwhile, because no interlacing layout is needed on the panel, the interference caused by the interlacing layout in the practical operation may also be avoided.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A touch display integrated circuit for controlling a touch display device, the integrated circuit comprising:
    a touch input/output circuit, comprising a plurality of input/output terminals;
    a source driving circuit, comprising a plurality of data output terminals;
    a common circuit, coupled to the touch input/output circuit and the source driving circuit;
    a plurality of touch input/output pins, each coupled to the input/output terminals of the touch input/output circuit; and
    a plurality of data output pins, each coupled to the data output terminals of the source driving circuit,
    wherein the plurality of touch input/output pins and the plurality of data output pins are arranged corresponding to an arrangement where a plurality of pads of the touch display device are disposed,
    wherein the arrangement comprises at least two data output pins between at least two adjacent touch input/output pins, wherein the at least two data output pins are used to transmit data signals for controlling the touch display device via routes on different layers;

wherein the at least one touch input/output pin is used to transmit touch signal via a route, which is formed on a layer different from the route for the adjacent data output pin to transmit the data signal.

2. The touch and display integrated circuit according to claim 1, wherein the common circuit is disposed between the touch input/output circuit and the source driving circuit.

3. The touch and display integrated circuit according to claim 1, wherein the at least two adjacent touch input/output pins are arranged on a same level along a first direction.

4. The touch and display integrated circuit according to claim 1, wherein the at least two adjacent touch input/output pins are arranged on different levels along a first direction.

5. The touch and display integrated circuit according to claim 1, wherein the at least two data output pins are arranged on a same level along a first direction.

6. The touch and display integrated circuit according to claim 1, wherein the at least two data output pins are arranged on different levels along a first direction.

7. The touch and display integrated circuit according to claim 1, wherein the at least two data output pins are respectively corresponding to sub-pixels of the touch display device for transmitting data to the sub-pixels.

8. The touch and display integrated circuit according to claim 1, wherein the touch input/output pins and the data output pins are arranged respectively along a first direction and a second direction to form a rectangular arrangement area.

9. The touch and display integrated circuit according to claim 1, wherein at least one of the touch input/output pins is surrounded by the data output pins on three sides.

10. The touch and display sensing integrated circuit according to claim 2, wherein at least one of the touch input/output pins is surrounded by the data output pins on three sides.

11. The touch and display integrated circuit according to claim 2, wherein the touch input/output pins and the data output pins are arranged respectively along a first direction and a second direction to form a rectangular arrangement area.

12. The touch and display integrated circuit according to claim 2, wherein the at least two adjacent touch input/output pins are arranged on a same level along a first direction.

13. The touch and display integrated circuit according to claim 2, wherein the at least two adjacent touch input/output pins are arranged on different levels along a first direction.

14. The touch and display integrated circuit according to claim 2, wherein the at least two data output pins are arranged on a same level along a first direction.

15. The touch and display integrated circuit according to claim 2, wherein the at least two data output pins are arranged on different levels along a first direction.

16. The touch and display integrated circuit according to claim 2, wherein the at least two data output pins are respectively corresponding to sub-pixels of the touch display device for transmitting data to the sub-pixels.

17. The touch and display integrated circuit according to claim 5, wherein the at least two data output pins comprises two of red, green and blue data output pins.

18. The touch and display integrated circuit according to claim 5, wherein the at least two data output pins comprises two of data pins selected from red, green and blue.

* * * * *